Patented May 30, 1944

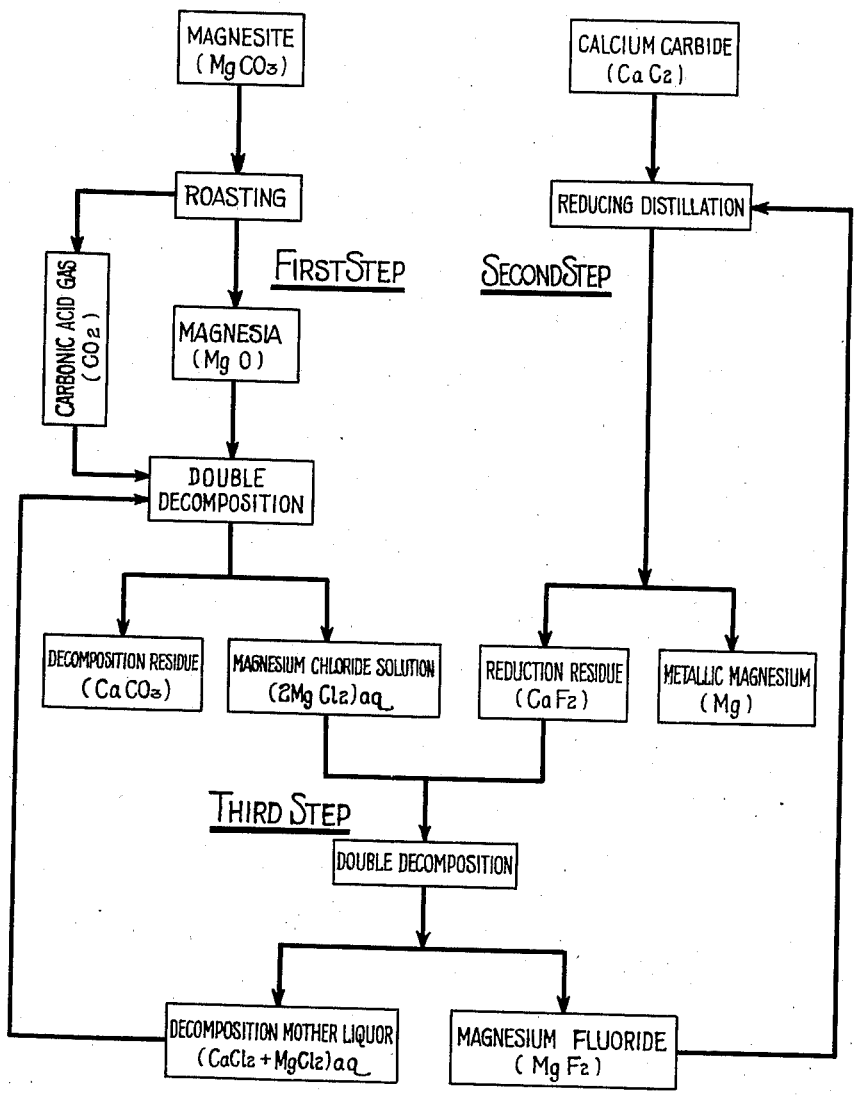

2,349,927

UNITED STATES PATENT OFFICE 2,349,927

METHOD OF MANUFACTURING METALLIC MAGNESIUM

Tsuyoshi Arimori, Yukio Konishi, Junkichi Ishibashi, and Rinnosuke Yoshimura, Dairen, Manchukuo; vested in the Alien Property Custodian Application April 22, 1941, Serial No. 389,728

7 Claims. (Cl. 75—67)

The present invention relates to a method of manufacturing metallic magnesium, which consists in double-decomposing the calcium fluoride-containing residue produced in manufacturing metallic magnesium by heating magnesium fluoride and calcium carbide, with magnesium salt solution having the acid radical that does not produce insoluble precipitates with lime, such as magnesium chloride and magnesium nitrate; providing the thus-separated magnesium fluoride as a reducible material using calcium carbide, while the mother liquor, namely, water-soluble salt of magnesium and lime is mixed with the roasted product of the initial material, magnesite or dolomite and is heated and caused to react, passing carbonic acid gas therethrough, the lime being precipitated as carbonate, while the magnesium salt solution is double-decomposed with the calcium fluoride-containing residue obtained as a by-product in the reaction of magnesium fluoride with calcium carbide and thus is converted to magnesium fluoride to be used as a reducible material. The object thereof is to obtain metallic magnesium of high purity very economically from magnesium-containing ores and calcium carbide by employing intermediate products cyclically through all the stages of the operation.

There is known a method of obtaining metallic magnesium of high purity from magnesium and silicon-containing ores such as magnesite or dolomite by manufacturing magnesium fluoride, mixing calcium carbide therewith intimately, reducing the mixture by heating it at above 750° C. under reduced pressure or in the presence of a reducing gas under the normal or reduced pressure so as to produce magnesium vapor and then condensing the said magnesium vapor.

This invention has improved the above known method, in which the calcium fluoride-containing residue produced by the reaction of magnesium fluoride with calcium carbide is converted into hydrofluoric acid and gypsum by being acted upon by sulphuric acid, and by treating magnesia-containing ores with the former, magnesium fluoride is manufactured. However, such method has the disadvantage of not alone employing undesirable hydrofluoric acid, but also consuming a large quantity of sulphuric acid. This invention has been completed as the result of diligent study regarding a process for recovering fluorine very effectively by treating the calcium fluoride-containing residue obtained as a by-product in the reaction of magnesium fluoride with calcium carbide, at the same time manufacturing magnesium fluoride from magnesia-containing ores easily. Especially, we have found that the magnesium fluoride produced in this invention is in small particles and possesses great reactivity when it is caused to react in a solid condition with calcium carbide, so that it is possible to produce magnesium vapor in a short time.

To make it easy to explain the present invention, let us begin with the manufacture of the various intermediate products necessary to start the operation. Firstly, prepare concentrated solution of magnesium salts having the acidic radical that does not produce insoluble precipitates with lime, such as magnesium nitrate or magnesium chloride obtained by dissolving magnesia in nitric acid or hydrochloric acid, etc. Next, after adding an excess of the above solution to a finely-pulverized fluoride (preferably, the solution of about 2 chemical equivalents against calcium fluoride), subject the mixture to heat-treatment, so that by double-decomposition it may be converted into the precipitate of magnesium fluoride and decomposition mother liquor (mixed solution of calcium salt and magnesium salt). The thus-obtained magnesium fluoride and decomposition mother liquor are only the intermediate products primarily necessary to start this operation. In practice and in a continuous operation these intermediate products are repeatedly produced in circuit and there is no necessity of making any special preparation for their manufacture.

The following is the detailed explanation of this invention divided into three steps of operation:

In the first step, firstly, very active magnesia is manufactured by roasting magnesia-containing ores such as magnesite and dolomite and is thrown into the above decomposition mother liquor prepared for the starting of the operation (mixed solution of calcium salt and magnesium salt. Subsequently the decomposition mother liquor produced in the third step described hereafter is used.) Next, carbonic acid gas is introduced thereinto, so that magnesia may be converted by double-decomposition into concentrated solution of magnesium salts having the acidic radical that does not produce insoluble precipitates with lime, such as magnesium nitrate, magnesium chloride, etc., and the lime is precipitated as calcium carbonate. Now, if the above reaction is shown by a chemical equation, taking magnesium chloride as a magnesium salt having the acidic radical that does not produce insoluble precipitates with lime, it is as follows (as the similar explanation may be given regarding the other magnesium salts, no explanation will be given hereafter regarding chloride):

$$MgO + CaCl_2 + MgCl_2 + CO_2 = CaCO_3 + 2MgCl_2 \quad (1)$$
(Solution) (Solution) (Precipitate) (Solution)

By the way, in this reaction the impurities present in the magnesia-containing ores and decomposition mother liquor, such as silicic acid, alumina, iron oxide, lime, etc. are not only all removed together with the precipitate of calcium carbonate, but also the chlorine in the decomposition mother liquor employed is wholly recovered and it is possible to prepare magnesium chloride solution of high purity from magnesia-containing-ores such as magnesite and dolomite.

The concentrated solution of magnesium chloride obtained in this step is used in the third step described hereafter.

Next, in the second step, mixing calcium carbide intimately with the magnesium fluoride prepared as above (subsequently the magnesium fluoride recovered and regenerated in the third step is employed), the mixture is reduced by heating it to above 750° C. under reduced pressure or in the presence of a reducing gas under the normal or reduced pressure so as to separate it into magnesium vapor and a calcium fluoride-containing substance, this reaction being shown by the following equation:

$$MgF_2 + CaC_2 = Mg + CaF_2 + 2C \quad (2)$$

The magnesium vapor reduced and distilled here is condensed and solidified and recovered as metallic magnesium of high purity, while the reaction residue is provided for the following third step.

In the third step, after adding an excess of the concentrated solution of magnesium chloride prepared in the first step (preferably, about two chemical equivalents against the calcium fluoride contained in the reduction residue) to the said reduction residue consisting chiefly of calcium fluoride which has been produced in the second step, the mixture is double-decomposed by heating and converted into the precipitate of magnesium fluoride and decomposition mother liquor containing calcium chloride and magnesium chloride, the reaction in this third step being as shown by the following equation:

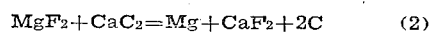
(Precipitate) (Solution) (Precipitate) (Solution) (Solution)

That is to say, by this step it is possible to recover completely the fluorine contained in the reduction residue obtained in the second step, as magnesium fluoride of high purity. The thus-obtained magnesium fluoride is a small and in homogeneous particles and has a considerably different physical property from that of the magnesium fluoride produced by reacting hydrofluoric acid upon powdered magnesite or lightly roasted magnesia. It is very quick in the speed of reaction with the said calcium carbide in the second step. The above reduction residue often containing considerable quantities of calcium carbide, lime, magnesia, etc., hinders the reaction of the third step, but these may be removed easily by washing the residue previously with dilute acid.

If the Equations (1), (2) and (3) in the first, second and third steps are combined, the following equation is obtained:

$$MgO + CO_2 + CaC_2 = Mg + CaCO_3 + 2C \quad (4)$$

In this way, according to the present invention the various materials employed intermediately are all recovered and utilized cyclically with good effect by the combination of all the steps and very pure metallic magnesium can be manufactured from magnesium-containing ores and calcium carbide only.

In short, this invention has rationalized the known method of obtaining metallic magnesium by using magnesium-containing ores such as magnesite and dolomite as the material and manufacturing magnesium fluoride as an intermediate product and reducing the same with calcium carbide. As the various materials used intermediately can be circulated effectively, the invention can be carried out very economically. Moreover, the magnesium fluoride obtained by this invention possesses great reactivity with calcium carbide and is very quick in the speed of the reaction.

The following is an example of performing this invention:

The analysis table of the materials used in this example, magnesite and calcium carbide, is as follows:

Magnesite (produced in Daisekkyo, Manchuria):

|  | Per cent |
|---|---|
| Magnesia | 46.20 |
| Lime | 0.54 |
| Alumina and iron oxide | 0.78 |
| Silica | 3.26 |
| Loss on ignition | 48.97 |

Calcium carbide (commercial):

| Calcium carbide | 72.5 |
|---|---|
| Lime | 14.5 |
| Silica | 3.4 |
| Alumina and iron oxide | 3.0 |
| Others | 6.6 |

FIRST STEP

Firstly, put 80.5 litres of the decomposition mother liquor (containing 9.0 kilograms of magnesium chloride and 10.4 kilograms of calcium chloride) obtained in the above third step of the circulating continuous operation, into a closed vessel, and after the addition of the active magnesia obtained by roasting 9.0 kilograms of magnesite powder having the above-mentioned constituents at 700° C., pass carbonic acid gas through it at approximately 80° C. while stirring it. Then, double-decomposition will be completed very easily, precipitating calcium carbonate. Next, filter and wash the said calcium carbonate, and 98.5 litres of magnesium chloride solution almost free from lime (containing 17.7 kilograms of magnesium chloride and 0.08 kilograms of calcium chloride) will be obtained. The pure magnesium chloride thus regenerated and recovered is provided directly for the Third step described hereafter.

SECOND STEP

If 6.3 kilograms of the magnesium fluoride regenerated in the Third step (purity, 97.39%) and 8.67 kilograms of calcium carbide powder having the before-mentioned constituents are mixed intimately and put into a reducing furnace and heated at 950° C. for one hour under the reduced pressure of a mercury column of 3–5 millimeters, 1.92 kilograms of solid metallic magnesium having the following purity and 12.5 kilograms of the reduction residue (consisting mainly of 57.99% of calcium fluoride, 1.72% of magnesium fluoride, 17.46% of carbon and 11.00% of lime, the rest being alumina, iron oxide, silica, calcium carbide and magnesia) are obtained.

*Metallic magnesium*

|  | Per cent |
|---|---|
| Purity | 99.93 |
| Impurities: |  |
| Silicon | 0.005 |
| Iron | 0.003 |
| Aluminium | 0.004 |

The reduction residue produced here is provided directly for the following Third step.

THIRD STEP

If the reduction residue obtained in the above second step is made into a muddy state by adding about 20 litres of water and then dilute hydrochloric acid is added while stirring the above residue, the calcium carbide, lime and other injurious matters contained in the residue are dissolved easily. Filter them. Next, after adding 98.5 litres of the magnesium chloride solution regenerated in the first step to this purified residue, double-decompose the mixture by heating and extract the thus-produced decomposition matter with warm water, while the precipitate produced is filtered and washed. Next, if this precipitate is roasted at a low temperature, 6.3 kilograms of magnesium fluoride (purity, 96.02%) and 83 litres of decomposition mother liquor (containing 8.91 kilograms of magnesium chloride and 10.34 kilograms of calcium chloride) are obtained. Such regenerated magnesium fluoride and decomposition mother liquor are repeatedly employed cyclically for the next Second step and the regeneration of the magnesium chloride solution of the next First step respectively. Further, the acid washed waste liquor obtained as a by-product in this step (containing chiefly calcium chloride) may be utilized for the preparation of magnesium chloride solution of high purity by the similar treatment to that given to the said decomposition mother liquor.

As will be seen from the above example, the yield of metallic magnesium in the Second step is about 80%, and if all the steps are combined, nearly 76% of the magnesium contained in the initial material, magnesite, can be recovered as metallic magnesium of high purity. However, the above is only one example and it is possible to raise the yield and purity of metallic magnesium by the proper selection of the operating condition of each step, material, etc.

We claim:

1. The method of recovering metallic magnesium which consists in roasting a magnesium ore, suspending it in a solution of a calcium salt, passing carbon dioxide into the solution, treating the resulting magnesium salt solution with calcium fluoride, returning the liquor to the calcium salt solution, distilling the residual magnesium fluoride with calcium carbide to vaporize metallic magnesium, and returning the calcium fluoride residue to the magnesium salt solution.

2. The method of recovering metallic magnesium which consists in roasting magnesite, suspending it in a solution of a calcium salt, passing carbon dioxide into the solution, treating the resulting magnesium salt solution with calcium fluoride, returning the liquor to the calcium salt solution, distilling the residual magnesium fluoride with calcium carbide to vaporize metallic magnesium, and returning the calcium fluoride residue to the magnesium salt solution.

3. The method of recovering metallic magnesium which consists in roasting dolomite, suspending it in a solution of a calcium salt, passing carbon dioxide into the solution, treating the resulting magnesium salt solution with calcium fluoride, returning the liquor to the calcium salt solution, distilling the residual magnesium fluoride with calcium carbide to vaporize metallic magnesium, and returning the calcium fluoride residue to the magnesium salt solution.

4. The method of recovering metallic magnesium, which consists in roasting a magnesium ore, suspending it in a solution of calcium chloride, passing carbon dioxide into the solution, treating the resulting magnesium chloride solution with calcium fluoride, returning the liquor to the calcium chloride solution, and distilling the residual magnesium fluoride with calcium carbide to vaporize metallic magnesium, and returning the calcium fluoride residue to the magnesium chloride solution.

5. The method of recovering metallic magnesium, which consists in roasting a magnesium ore, suspending it in a solution of calcium nitrate, passing carbon dioxide into the solution, treating the resulting magnesium nitrate solution with calcium fluoride, returning the liquor to the calcium nitrate solution, and distilling the residual magnesium fluoride with calcium carbide to vaporize metallic magnesium, and returning the calcium fluoride residue to the magnesium nitrate solution.

6. The method of recovering metallic magnesium which consists in roasting a magnesium ore, suspending it in a solution of a calcium salt, passing carbon dioxide into the solution, treating the resulting magnesium salt solution with calcium fluoride, returning the liquor to the calcium salt solution, distilling the residual magnesium fluoride with calcium carbide to vaporize metallic magnesium, removing impurities from the calcium fluoride residue by solution in acid and returning the purified calcium fluoride to the magnesium salt solution.

7. The method of recovering metallic magnesium which consists in roasting a magnesium ore, suspending it in a solution of a calcium salt, passing carbon dioxide into the solution, treating the resulting magnesium salt solution with an amount of calcium fluoride insufficient to satisfy all of the magnesium salt present, returning the liquor containing the excess magnesium salt to the calcium salt solution, distilling the residual magnesium fluoride with calcium carbide to vaporize metallic magnesium and returning the calcium fluoride residue to the magnesium salt solution.

TSUYOSHI ARIMORI.
YUKIO KONISHI.
JUNKICHI ISHIBASHI.
RINNOSUKE YOSHIMURA.